Nov. 3, 1925. Re. 16,194

R. BASS

PRESSER FOR VELOUR, BOLIVIA, ETC.

Original Filed Oct. 4, 1922

Inventor

Rubin Bass

By his Attorney

Robert S. Allyn.

Reissued Nov. 3, 1925. Re. 16,194

UNITED STATES PATENT OFFICE.

RUBIN BASS, OF BROOKLYN, NEW YORK.

PRESSER FOR VELOUR, BOLIVIA, ETC.

Original No. 1,453,697, dated May 1, 1923, Serial No. 592,241, filed October 4, 1922. Application for reissue filed April 10, 1925. Serial No. 22,235.

*To all whom it may concern:*

Be it known that I, RUBIN BASS, a citizen of the United States of America, residing in the borough of Brooklyn, city of New York, have invented a new and useful Presser for Velour, Bolivia, Etc., of which the following is a specification.

My invention relates to means for pressing what are commonly termed nap materials such as velour, bolivia, duvetyn, etc.

Pressing boards as heretofore constructed consist of cloth foundations with wire pins, needles or bristles projecting therefrom and held in place by a cloth backing glued or cemented to the foundation.

In order to press the nap material it is necessary first to moisten it so that steam will develop when the hot iron is passed over it. The heat of the iron together with the water or steam causes the glue or cement to soften and deteriorate so that the backing gives way and permits the staple-like needles to work out of the foundation thus rendering the device useless. As a further protection to such a device, wooden or sheet metal bases or holders are sometimes employed as disclosed in my Patents No. 1,127,580, February 9, 1915 and No. 1,161,283, November 23, 1915. Such constructions, however, are not only heavy and clumsy but serve to retain the moisture so as to rot out the foundation and backing, rust the needles, and produce an unsanitary condition. The heating of the glue or cement also causes odors which are unpleasant and unhealthy.

I have discovered that these difficulties may be avoided in a very simple manner by simply stitching the backing to the foundation instead of gluing or cementing it. By making the backing of fine mesh wire cloth I avoid the scorching and damage which would be done to a cloth backing and I also make it possible to more efficiently transmit heat from the pressing iron through the wire mesh to the back of the needles.

Fig. 6 is a fragmentary view showing the presser folded over so as to press both sides of a fold of velvet or the like.

Figure 1:
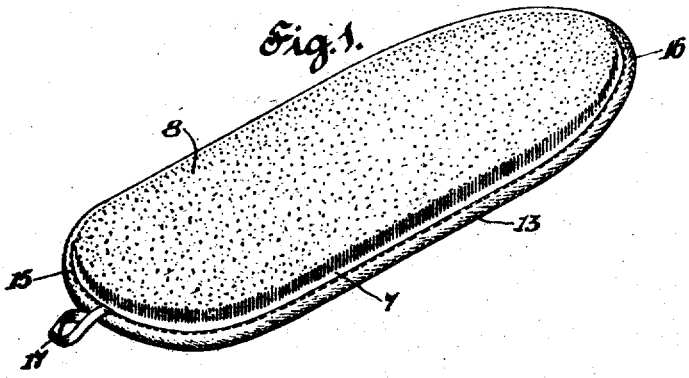
Fig. 1 is a perspective of one form of presser of my invention.
Figure 2:
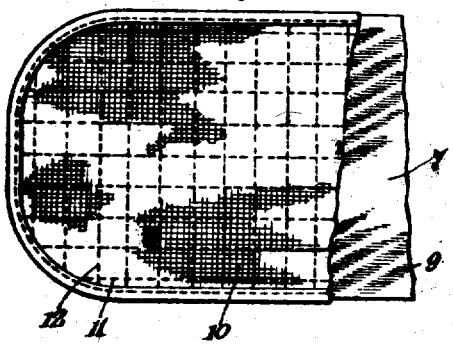
Fig. 2 is a fragmentary back view of the presser of my invention.
Figure 3:
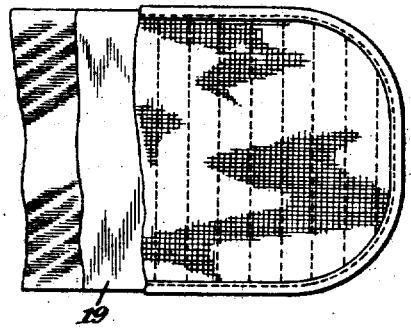
Fig. 3 is another fragmentary view showing a modification.
Figure 4:
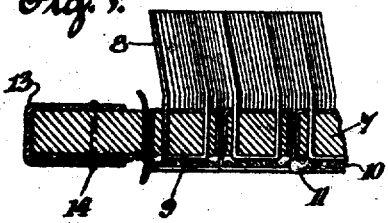
Fig. 4 is an enlarged fragmentary section of the presser embodying my invention.

The foundation 7 may be of any suitable construction such as cloth usually employed in devices of this character. The needles 8 are usually of steel of U shape inserted through the foundation with loop portions 9 at the back. The backing fabric 10 may be of any suitable material within a broad scope of my invention but is preferably of a finely woven wire fabric for instance of brass, copper or bronze wires. This backing is stitched to the foundation by a series of stitches such as 11 and 12 running either longitudinally or transversely or in both directions sufficiently close together so as to securely bind the backing to the foundation. Fig. 2 shows the stitching running transversely as well as longitudinally and Fig. 3 shows the stitching running only transversely. The design and particular arrangement of stitching, however, may be varied widely within the scope of my invention. In some cases it is desirable to employ fine wire for the stitching for either the top or bottom or for both sides of the presser. Preferably the rows of stitches run parallel to the cross members or loops of the staples as it is easier to stitch the parts in this manner.

At the edges the device may conveniently be bound with tape 13 which may be stitched on as indicated at 14.

The device may be of any shape within the broad scope of my invention but preferably one end as at 15 is broad so that it may conveniently be inserted in a collar of a coat or the like and the other end 16 is preferably more or less pointed or tapered so that it may conveniently be inserted, for instance, in the end of a sleeve. I also may conveniently provide a loop 17 at one end by which the device may be hung up when not in use.

Figure 5:
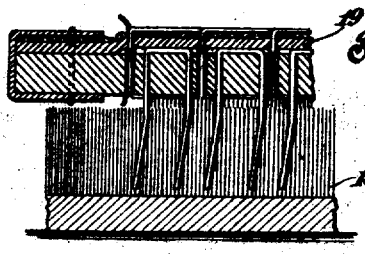
Fig. 5 is an enlarged fragmentary section showing the presser of Fig. 3 superposed on a nap or pile fabric.

In Fig. 5 I have illustrated on an enlarged scale how such a device would be used. In this case 18 indicates the pile or nap fabric or material supported in a suitable manner and with the pressing device placed on top of it. In this case as well as in Fig. 3 I have shown a layer of fabric 19 interposed between the foundation and the backing although this is not always necessary and in some cases may not be desirable. When such a layer is omitted the heat of the iron applied to the backing 10 is transmitted directly to the back of the needles so as to produce a maximum heating effect.

Figure 6:
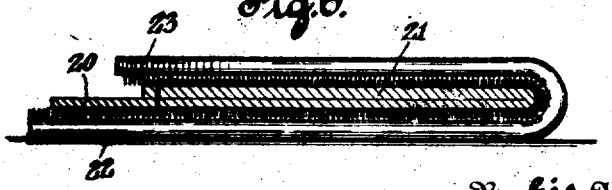

Fig. 6 shows that the device is sufficiently flexible to permit it to be doubled over and press not only the main part 20 of the nap fabric but also a hem 21. In this case the main part 22 of the presser will, of course, be supported in a suitable manner and the edge or end 23 is folded over upon the hem.

By the use of my improvement I am able to provide a presser which is always flexible and in good condition for use. In view of the secure and permanent manner in which the backing is secured to the foundation I am enabled to employ longer and heavier needles than has heretofore been found practical and in that way I am able to satisfactorily press fabrics having longer nap than ordinary velvet or plush. I have found that I can use wire from #33 gauge up to #18 gauge and from a 16th to ½ inch long. Although a given size wire may be employed for many different materials it is of course preferable that longer and heavier needles be employed on material having a coarser and longer nap.

Preferably the body is made up of at least three layers or plies of fabric so as to give a maximum stiffness to the needles and at the same time a maximum of flexibility to the body.

I claim:

1. A pressing device comprising a cloth foundation having wire needles projecting therefrom and a backing stitched to the foundation by lines of stitches traversing over the surface thereof to hold the backing to the foundation and prevent the needles from working loose.

2. A pressing device comprising a cloth foundation having needles extending through to the back and a flexible metallic backing secured to the foundation and in direct contact with the backs of the needles so as to conduct heat thereto.

3. A flexible pressing device comprising a cloth foundation having needles extending therethrough from the back and a fine mesh wire backing secured to the foundation over the backs of the needles at close intervals to prevent the needles from working loose.

4. A flexible pressing device comprising a textile cloth foundation, U-shaped needles extending entirely through the foundation, a flexible backing and wire members securing the backing to the foundation at frequent intervals throughout the surface to prevent the needles from working loose.

5. A flexible pressing device comprising a body portion consisting of a plurality of layers of fabric, staples having their cross members embedded between layers of said fabric and their points projecting from one side of said body portion, and lines of stitching to secure said layers of fabric together and hold said staples in position.

6. A flexible pressing device comprising a body portion including a plurality of layers of fabric, staples supported by said layers of fabric and having their points projecting from one side of the body portion, and stitches passing through said layers to hold them together.

RUBIN BASS.